United States Patent [19]

Wagner

[11] 4,179,656
[45] Dec. 18, 1979

[54] DETERMINATION OF AVERAGE SPEED OF ROTATION OF A CYCLICALLY LOADED SHAFT DURING PERIODS OF UP TO TWO MINUTES DURATION

[75] Inventor: Raymond L. Wagner, Greensboro, N.C.

[73] Assignee: Burlington Industries, Inc., Greensboro, N.C.

[21] Appl. No.: 875,578

[22] Filed: Feb. 6, 1978

[51] Int. Cl.² ............................................. G01P 11/00
[52] U.S. Cl. .................................... 324/166; 364/565
[58] Field of Search ............... 324/160, 161, 166, 167, 324/173–175; 361/236, 240; 364/565; 340/670–672

[56] References Cited

U.S. PATENT DOCUMENTS 3,757,167  9/1973  Yoshikawa et al. ................. 324/160

OTHER PUBLICATIONS

Bederman, S.; Computer and Apparatus for Measuring Rotational Speed; IBM Tech. Bull; vol. 13; No. 4; Sep. 1970; pp. 1017–1018.

Primary Examiner—Robert J. Corcoran
Attorney, Agent, or Firm—Cushman, Darby & Cushman

[57] ABSTRACT

A method of determining average speed of a cyclically loaded rotating shaft, and an electronic tachometer for practicing the method. The revolutions of the shaft are counted electronically, a highly time-regular pulse stream is provided, and simultaneously with the counting of the shaft revolutions, the number of pulses in the pulse stream is counted over a time span of between 2 and 120 seconds. Then, the number of revolutions counted is electronically divided by the number of time pulses counted during the time span of 2 to 120 seconds to determine average speed, the speed so determined is digitally displayed, and the revolution and time pulse counting cycles are restarted. The accuracy of the average speed displayed is ±0.05%±1 count when the time span is 2 seconds, with a resolution of 0.1 rpm.

17 Claims, 3 Drawing Figures

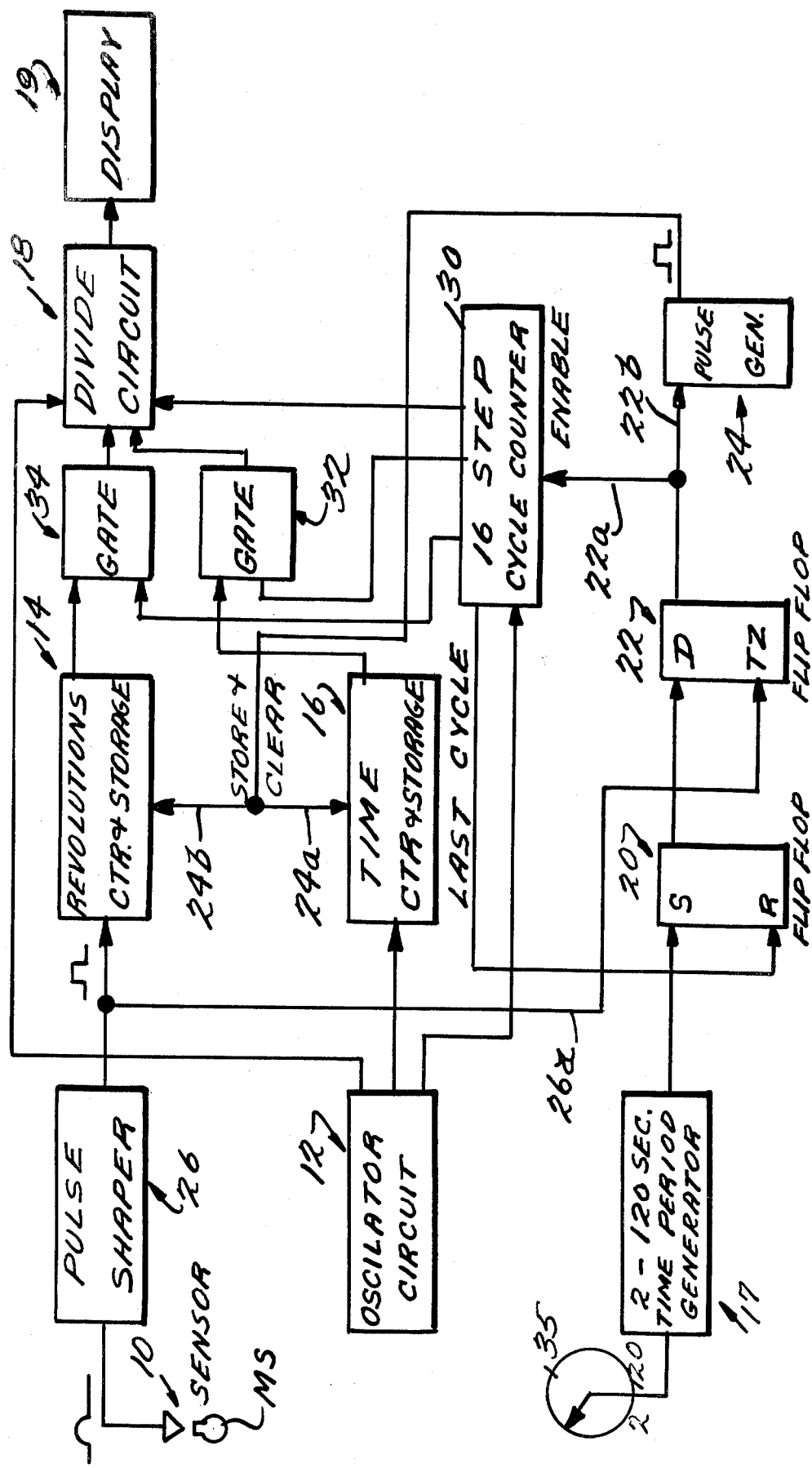

DETERMINATION OF AVERAGE SPEED OF ROTATION OF A CYCLICALLY LOADED SHAFT DURING PERIODS OF UP TO TWO MINUTES DURATION

BACKGROUND AND SUMMARY OF THE INVENTION

Known electronic tachometers presently on the market are not capable of quick and simple determination of the average speed of a cyclically loaded rotating shaft, especially with the accuracy and resolution required in order to determine the power output of the rotating shaft. However, there are many circumstances where accurate, high resolution determination of a cyclically loaded rotating shaft's average speed is necessary. For instance, in common textile processes, motor shafts are often conventionally connected to a cyclic time varying load, and accurate average speed measurement over the cycle is necessary in such situations in order to obtain an accurate determination of motor power output. Accurate determination of motor power output allows adjustment to the motors or processes in order to more effectively utilize electrical energy. Tachometers presently on the market are generally either of the analog variety or are of the one or two second sampling rate type. The analog tachometers are difficult to read with the accuracy and resolution required in power calculations, and while the sampling rate types have greater accuracy, they are capable of measuring the average speed only for a one or two second period, and not over an entire cyclic period.

According to the present invention, a method is provided for electronically simply and easily determining the average speed of a cyclically loaded rotating shaft, and an electronic tachometer having an accuracy of ±0.05%, ±1 count (when the time span is 2 seconds) with a resolution of 0.1 rpm, is provided for practicing the method. In this way, a simple, accurate average speed measurement over a cycle is obtained suitable for use in motor power output calculations. According to the present invention, average shaft speed may be accurately determined over an adjustable cycle span of from 2 to 120 seconds, fulfilling all the necessary requirements for motor power calculations especially in the textile processing environments. Another application of the invention is in determining yield on spinning frames.

According to the method of the present invention, the average speed of a cyclically loaded rotating shaft is determined by the steps of electronically counting the revolutions of the shaft, providing a highly time-regular pulse stream, simultaneously with a counting of the shaft revolutions counting the number of pulses in the highly time-regular pulse stream over a time span between 2 and about 120 seconds, dividing the number of revolutions counted by the number of time pulses, during the 2 to about 120 seconds time span to determine average speed, and digitally displaying the average speed determined. Restarting of the revolution and time pulse counting cycles takes place during dividing of the stored, counted revolutions and time pulses. The accuracy of the average speed displayed is ±0.05%, ±1 count when the time span is 2 seconds (accuracy increasing as the time span increases), with a resolution of about 0.1 rpm with a capability of measuring maximum average speed of about 5000 rpm for a 120 second time span (with maximum average speed determinable increasing as the time span decreases). The average speed so determined is suitable for use in calculating motor power output in order to ultimately achieve greater energy efficiency of the motors.

The electronic tachometer according to the present invention comprises means for sensing each revolution of a rotating shaft, means for electronically counting and storing the number of revolutions of the shaft, means for electronically generating a highly time-regular pulse stream, means for counting and storing the number of pulses in the highly time-regular pulse stream over a given time span simultaneously with a counting of the number of shaft revolutions, means for controlling the given time span so that it is adjustable to a time span within the range of 2 to about 120 seconds, means for electronically dividing the number of revolution pulses counted by the number of time pulses counted during the given time span to determine the shaft average speed, and means for digitally displaying average speed so determined. While a wide variety of solid state components are utilizable in practicing the invention, the time-regular pulse stream generating means preferably comprises a crystal stabilized oscillator circuit; a time span generating means comprises a programable timer with a variable resistor providing adjustment of the time span; the shaft revolution and time pulse counting means preferably comprise BCD counters; and the dividing means preferably comprises a calculator chip. A pulse shaper is preferably disposed between the sending means and the shaft revolution counting means, and a cycle counter is provided for manipulating the stored revolution and time count data into the dividing means, the cycle counter preferably comprising a plurality of shift registers.

It is the primary object of the present invention to provide a method and apparatus for the determination of the average speed of a cyclically loaded rotating shaft with sufficient accuracy and resolution to be useful in calculating power output of the rotating shaft. This and other objects of the invention will become clear from an inspection of the detailed description of the invention, and from the appended claims.

BRIEF DESCRIPTION OF THE DRAWINGS

FIG. 1 is a block diagram of an exemplary electronic averaging tachometer according to the present invention.

DETAILED DESCRIPTION OF THE DRAWINGS

Figure 2A:
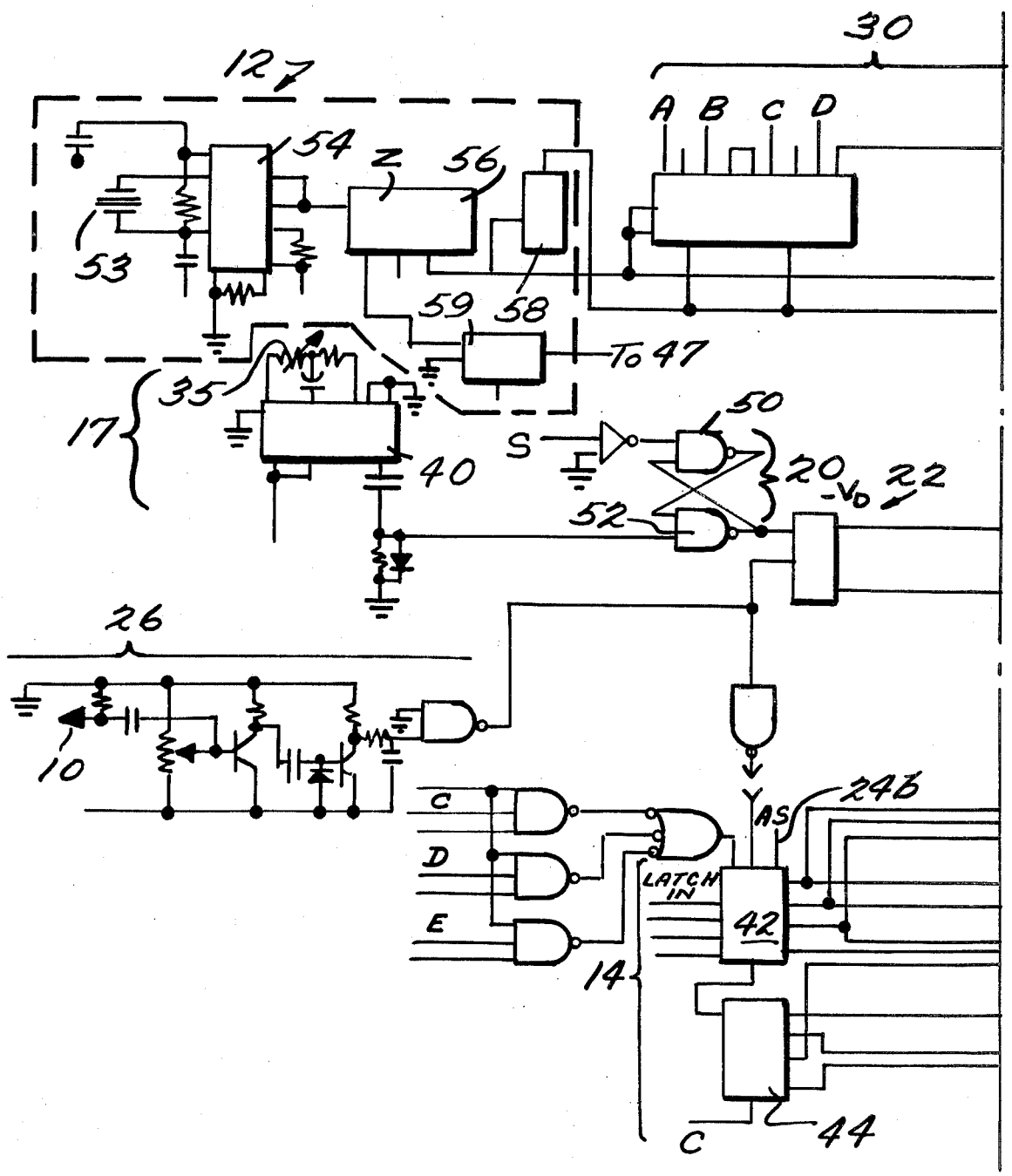
FIGS. 2a and 2b provides a detailed circuit diagram of the tachometer of FIG. 1.

The major components of an electronic tachometer according to the present invention, for determining average speeds of rotating cyclically loaded shafts, are illustrated in block form of FIG. 1. The tachometer includes a means 10 (such as a conventional photosenser) for sensing each revolution of a rotating shaft MS, means 14 for electronically counting and storing the number of revolutions of the shaft, means 12 for electronically generating a highly time-regular pulse stream, means 16 for counting and storing the number of pulses in the highly time-regular pulse stream over a given time span simultaneously with the counting of the number of shaft revolutions, means 17 for controlling the given time span so that it is adjustable to a time span within the range of 2 to about 120 seconds, means 18 for electronically dividing the number of revolution pulses counted by the number of time pulses counted during the given time span to determine the average shaft speed, and means 19 for digitally displaying the average speed so determined. As illustrated in the block diagram, the time span controlling means 17 preferably is operatively connected through first and second flip-flops 20, 22, and a pulse generator 24 to the time pulse counting means 16, and revolutions counting means 14 via lines 24a and 24b respectively. A pulse shaper 26 is operatively connected to the sensing means 10 and the revolution counting means 14, and to an input of the second flip-flop 22. The pulse stream generating means 12 is connected to the time pulse counting means 16, and a cycle counter 30, the line 22a from the second flip-flop 22 providing the enable for the cycle counter 30, and the cycle counter 30 being connected to an input of the first flip-flop 20. The counters 14, 16 are connected through the gates 34, 32 to the divide circuit 18, with the oscillator circuit 12 and the cycle counter 30 providing inputs to the divide circuit 18.

The count representing time is obtained from the output of the crystal stabilized oscillator circuit 12, and the period of time over which the speed is averaged is manually controlled by a potentiometer 35 connected to the time period generator circuit controlling means 17. The potentiometer 35 is adjustable between 2 seconds and about 120 seconds. When the selected time period elapses, a single pulse is generated by the means 17 which sets an R-S flip-flop 20. Upon completion of the next received revolution pulse, the D flip-flop 22 is set by a signal from input line 26a which generates an enable signal through line 22a to the 16 step cycle counter 30, and a store and clear pulse through line 22b and pulse generator 24 to the revolution counter 14 and the time counter 16 through lines 24b and 24a, respectively. The contents of both counters 14, 16 at the end of the last revolution pulse are stored in latches inside each counting means intergrated circuit 14, 16 (see FIG. 2) preparatory to being used in the ensuing calculation cycle.

The counter portion of the means 14, 16 is cleared to zero and released for counting during the ensuing time period. The calculation for the average speed during the past time period occurs simultaneously with the counting of revolution and time pulses for the ensuing time period. The 16 step cycle counter 30 manipulates the stored revolution and time count data into the divide circuit 18 by the generation of sequential pulses through the gates 32 and 34. The cycle generator 30 may be envisoned as a person's finger pushing calculator keys when data is being entered into a calculator. The most significant digit of the numerator is entered first, then the second, etc., remembering to the key the decimal point at the proper place, then keying the divide function and entering the denominator number in similar fashion. When the "equals" function is keyed, the calculation is performed by the means 18, and the output results in the digital display 19. The calculation process takes about a second so it is completed well before the shortest time period to which the potentiometer 35 is adjustable.

Figure 2B:
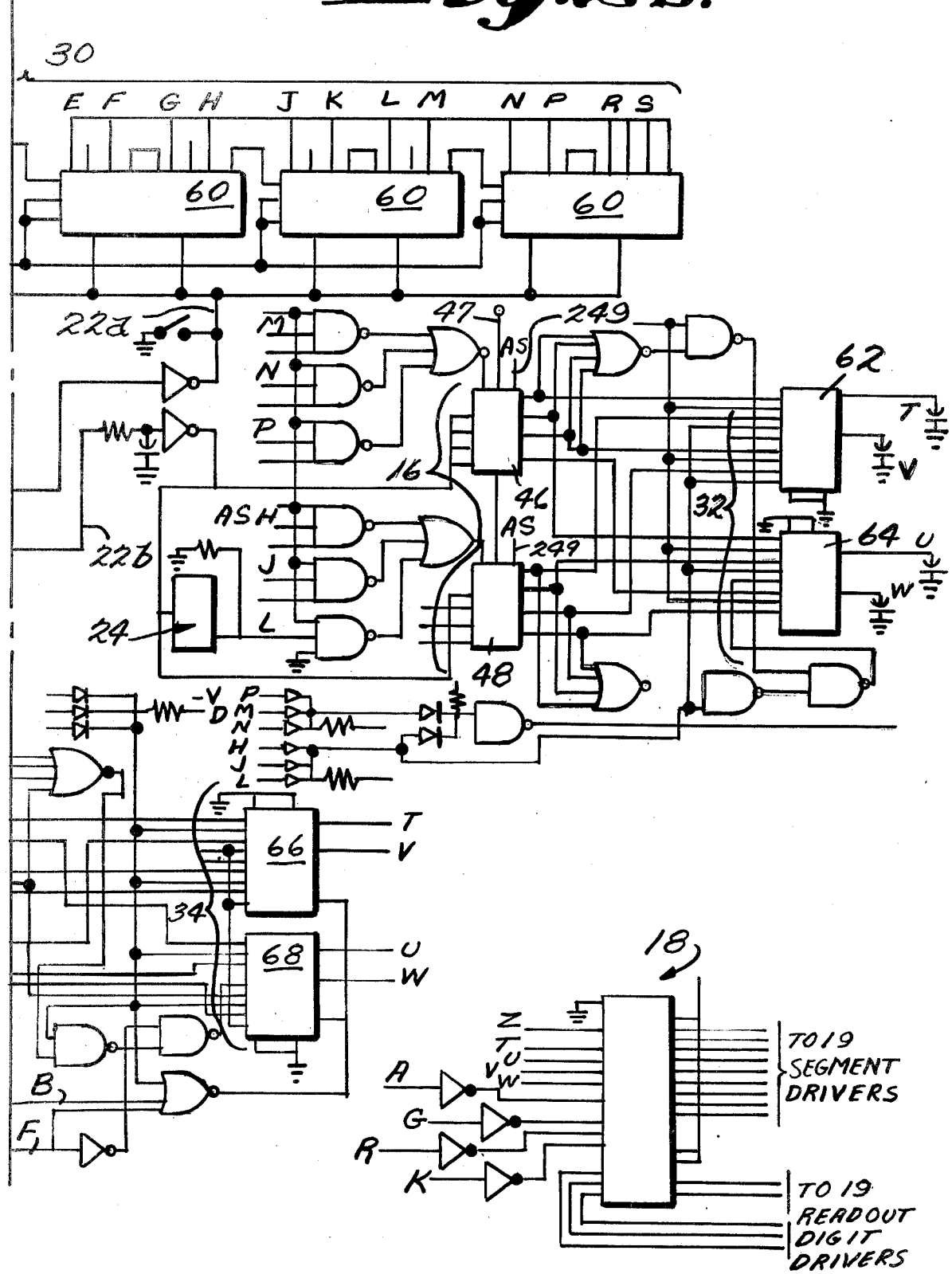

While a wide variety of commercially available components may be utilized to construct the tachometer illustrated in FIG. 1, exemplary components that are utilizable to obtain the desired results are schematically illustrated in FIGS. 2a and 2b and will be described hereinafter.

For convenience, all component numbers relate to those manufactured by Motorola, unless otherwise indicated.

The time span controlling means 17 preferably comprises the potentiometer 35 operatively connected to a programable timer 40, such as an MC 14541 B. The revolutions counting means and storage preferably includes a pair of BCD counters, the first counter 42 being operatively connected by line 24b to the pulse generator 24 and comprising a three digit BCD counter such as an MC 14553 B, and the second counter 44 comprising a dual BCD up-counter such as an MC 14518 B. The time pulse counting means 16 also preferably includes a pair of BCD counters 46, 48, each operatively connected by line 24a to the pulse generator 24, and each comprising a 3-digit BCD counter such as an MC 14553 B.

The first flip-flop 20 preferably comprises an RS flip-flop with an input from the last cycle(s) of the 16 step cycle counter 30. The flip-flop 20 may comprise a pair of NAND gates 50, 52 interconnected as illustrated in FIG. 2a. Suitable NAND gates are Schmitt trigers MC 14093 B. The second flip-flop 22 preferably comprises a D flip-flop, such as a dual-type D flip-flop, MC 14013 B. The pulse generator 24 may also comprise a dual-type D flip-flop MC 14013 B, connected as illustrated in FIG. 2b and connected by lines 24a to the counters 46, 48 and by line 24b to the counter 42.

The oscillator circuit means 12 is preferably stabilized by the crystal 53 and includes as component parts thereof the inverter 54, binary counter 56, flip-flop 58, and counter 59. The inverter 54 preferably comprises a dual complimentary pair plus inverter, such as MC 14007 B, the counter 56 preferably comprises a 12 bit binary counter such as MC 14040 B, the flip-flop 58 preferably comprises a dual type D flip-flop, such as MC 14013 B, and the counter 59 preferably comprises a dual BCD up-counter, such as MC 14518 B. The counter 59 is connected by terminal 47 to the counter 46; the flip-flop 58 is connected to the cycle counter 30; and the binary counter 56 is connected by a terminal Z to the divide circuit 18.

The cycle counter 30 preferably comprises a 16 step cycle counter including a plurality of shift registers 60. For instance, 4 dual 4-bit static shift registers, such as MC 14015 B, may be provided, having outputs A, B, C, D, E, F, G, H, J, K, L, M, N, P, R, S. The dividing circuit means 18 preferably comprises a calculator chip, a Radio Shack CT 5002 being suitable. Outputs A, R, G, and K of the shift register 60 are connected directly to the calculator chip 18.

The gates 32, 34 each preferably comprise first and second and/or invert gates 62, 64, 66, 68 respectively, which may each comprise an MC 14506 B. Outputs T, V of the gates 62, 66 are commonly connected to the inputs T, V, of the chip 18, while outputs U, W, of the gates 64, 68 are commonly connected to the inputs U, W, of the chip 18. Another input to the chip 18 is provided at Z from the binary counter 56 of oscillator circuitry 12, as previously described.

Other outputs from the shift register 60 are interconnected to circuit components as illustrated in FIGS. 2a and 2b; for instance, output C being connected to counter 44, through NAND and NOR gates to counter 42, and through a diode to gates 66, 68. The other outputs are also connected as illustrated, the last cycle counted by the means 30 being connected via output S through an inverter to the NAND gate 50 of flip-flop 20.

The tachometer illustrated in FIGS. 1 and 2a and 2b is useful for determining yield on spinning frames and for obtaining the average speed of an electric motor during a varying load cycle in order to derive the average power, and is also useful for production studies on knitting machines; in addition to having a wide variety of other functions. The tachometer is capable of being constructed in a very small size (i.e., 3×5×7½ inch container with a weight of 2 lbs.), and may be adapted to run on a self-contained power supply which requires recharging only after several hours of continuous use. The display 19 may be fitted with a read and a "lock-on" signal to tell the operator when an input signal has been received, and because of the capability of the counting means 14, 16 to have the counter portions thereof cleared to zero and released for counting, an ensuing time period count can occur simultaneously with the continued calculations with the stored data from previous time period. Since the calculation process takes about a second, it is completed well before the shortest possible ensuing time period from generator 17. The tachometer is capable of measuring a shaft MS speed of from 1 to 5,000 rpm with a resolution of 0.1 rpm, and an accuracy of ±0.05% ±1 count at the smallest time span setting (i.e., about 2 seconds); the maximum displayed number may be 9999.9 with the maximum average rate displayed for 120 seconds of 4999.9 (the maximum rate increasing as the time span selected decreases). The tachometer also is capable of performing at temperatures from 0° to 60° C., and in environments found in industrial plants, and humidity will not affect the tachometer unless water forms on the electronics. The accuracy and resolution of the average speed is sufficient to allow subsequent accurate determination of motor output in order to utilize electrical energy more efficiently.

The tachometer illustrated in the drawings is useful for accomplishing a method for determining the average speed of a cyclically loaded rotating shaft MS. The method comprises the steps of electronically counting the revolutions of the shaft, with means 10, 14; providing a highly time-regular pulse stream, with means 12; and simultaneously with the counting of the shaft revolutions counting the number of pulses in the time-regular pulse stream over a time span of between 2 and about 120 seconds (with means 17, 16). The method further comprises the steps of dividing the number of revolutions counted by the number of time pulses counted during the 2 to about 120 seconds time span (utilizing means 30 and divide circuit 18), to determine average speed, and digitally displaying average speed determined on digital display 19, with the revolution and time pulse counting cycles restarted once the counting means 14, 16 count proportions are cleared with the calculations in the storage portions thereof taking place. The potentiometer 35 is manually adjusted to control the length of the time span depending upon the nature of the cyclic load and the rotating shaft MS.

While the invention has been herein shown and described in what is presently conceived to be the most practical and preferred embodiment thereof, it will be apparent to those of ordinary skill in the art that many modifications may be made thereof within the scope of the invention, which scope is to be accorded the broadest interpretation of the appended claims so as to encompass all equivalent structures and methods.

What is claimed is:

1. A method for determining the average speed of a cyclically loaded rotating shaft, comprising the steps of
   electronically counting and storing the revolutions of the shaft,
   providing a highly time-regular pulse stream,
   simultaneously with the counting of the shaft revolutions counting and storing the number of pulses in the highly time-regular pulse stream adjustable over a time span between 2 to about 120 seconds,
   dividing the number of counted revolutions stored by the number of counted time pulses stored during the 2 to about 120 seconds time span, to determine average speed, and
   digitally displaying the average speed determined.

2. A method as recited in claim 1 wherein the accuracy of the average speed displayed is at ±0.05% ±1 count when the time span is 2 seconds, and
   wherein the resolution of the average speed displayed is 0.1 rpm.

3. A method as recited in claim 2 wherein the cyclically loaded rotating shaft is driven by a motor, and comprising the further step of calculating motor power output utilizing the average speed determined.

4. A method as recited in claim 1 comprising the further steps of terminating the revolution and time pulse counting cycles, and then restarting the revolution and time pulse counting cycles during dividing of the stored, counted revolutions and time pulses.

5. An electronic tachometer for determining average speeds of rotating cyclically loaded shafts, comprising
   means for sensing each revolution of a rotating shaft,
   means for electronically counting and storing the number of revolutions of the shaft,
   means for electronically generating a highly time-regular pulse stream,
   means for counting and storing the number of pulses in the highly time-regular pulse stream over a given time span simultaneously with the counting of the number of shaft revolutions,
   means for controlling the given time span so that it is adjustable to a time span within the range of 2 to about 120 seconds,
   means for electronically dividing the number of revolution pulses counted by the number of time pulses counted during the given time span to determine the shaft average speed, and
   means for digitally displaying the average speed determined.

6. A tachometer as recited in claim 5, wherein said means for generating a highly time-regular pulse stream comprises a crystal stabilized oscillator circuit and wherein said time span controlling means comprises a variable resistor operatively connected to a solid-state programmable timer.

7. A tachometer as recited in claim 5, further comprising means for manipulating the stored revolution and time count data into said dividing means, said manipulating means comprising a cycle counter.

8. A tachometer as recited in claim 7 wherein said cycle counter comprises a plurality of shift registers.

9. A tachometer as recited in claim 5, wherein said shaft revolutions counting means includes a pair of BCD counters.

10. A tachometer as recited in claim 9, further comprising a pair of dual and/or invert gates operatively connected between said BCD counters and said dividing means.

11. A tachometer as recited in claim 5, wherein said time pulse counting means comprises a pair of BCD counters.

12. A tachometer as recited in claim 11, further comprising a pair of dual and/or invert gates operatively connected between said BCD counters and said dividing means.

13. A tachometer as recited in claim 5, wherein said dividing means comprises a calculator chip.

14. A tachometer as recited in claim 5, further comprising a pulse shaper disposed between said sensing means and said means for counting the number of shaft revolutions.

15. A tachometer as recited in claim 5, further comprising first and second flip-flops and a pulse generator operatively connected between said time span controlling means and said time pulse counting means and revolutions counting means, a cycle counter operatively connected to an input of said first flip-flop and to an output of said second flip-flop, and said pulse generating means comprising a crystal stabilized oscillator circuit means operatively connected to said time pulse counting means.

16. A tachometer as recited in claim 15, further comprising a pulse shaper operatively connected to said sensing means and said shaft revolution counting means, and operatively connected to an input of said second flip-flop, and further comprising and/or invert gates operatively connected between said time pulse counting means and said dividing means and said shaft revolutions counting means and said dividing means.

17. A tachometer as recited in claim 5 wherein said revolutions counting and storing means, time pulse counting and storing means, and time span controlling means include means for terminating the revolution and time pulse counting cycles, and then restarting the revolution and time pulse counting cycles during dividing of the stored, counted revolutions and time pulses from the present cycle.

* * * * *